United States Patent [19]

Kobylinski et al.

[11] 3,895,095
[45] July 15, 1975

[54] RUTHENIUM PHOSPHATES AS NEW COMPOUNDS AND PROCESS OF USING SAME

[75] Inventors: Thaddeus P. Kobylinski, Cheswick; Brian W. Taylor, Richland Township, both of Pa.

[73] Assignee: Gulf Research & Development Company, Pittsburgh, Pa.

[22] Filed: July 2, 1973

[21] Appl. No.: 375,962

[52] U.S. Cl. .............. 423/305; 252/437; 423/309; 423/315; 423/213.5
[51] Int. Cl. ............................................ C01b 25/26
[58] Field of Search ........ 423/213.5, 217, 239, 305, 423/309, 315; 252/437, 435

[56] References Cited
UNITED STATES PATENTS

| | | | |
|---|---|---|---|
| 3,118,727 | 1/1964 | Cohn | 423/239 |
| 3,224,831 | 12/1965 | Stephens | 252/437 |
| 3,230,034 | 1/1966 | Stiles | 423/213.5 |
| 3,414,390 | 12/1968 | Riess | 423/305 |
| 3,706,815 | 12/1972 | Alley | 252/437 X |

*Primary Examiner*—G. O. Peters

[57] ABSTRACT

Ruthenium phosphates as new compounds and a process for reducing nitrogen oxides in auto exhaust gases using such compounds are claimed.

13 Claims, No Drawings

RUTHENIUM PHOSPHATES AS NEW COMPOUNDS AND PROCESS OF USING SAME

This invention relates to new ruthenium phosphates defined by the following formulae:

(I) 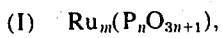

wherein $n$ is an integer of at least 2, preferably from 2 to 20, most preferably from 2 to 10, $$m = \left[\frac{n}{8}\right] + 1 \text{ to } \frac{n+2}{2}$$

when $n$ is an even integer and $$m = \left[\frac{n-3}{8}\right] + 2 \text{ to } \frac{n+1}{2}$$

when $n$ is an odd integer; and (II) 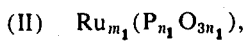

wherein $n_1$ is an integer of at least 3, preferably 3 to 10, most preferably from 3 to 7, $$m_1 = \left[\frac{n_1-2}{8}\right] + 1 \text{ to } \frac{n_1}{2}$$

when $n_1$ is an even integer, and $$m_1 = \left[\frac{n_1-5}{8}\right] + 2 \text{ to } \frac{n_1-1}{2}$$

where $n_1$ is an odd integer.

Compounds I are linear, while Compounds II are cyclic. In each instance, however, the Compounds are characterized by having P—O—P bonds, with each phosphorus in the Compounds being pentavalent. On the other hand, since ruthenium can have a valence of +2, +3, +4, +6 and +8, it can be present in the new Compounds in any one or combination of its valency forms. Thus, a linear ruthenium phosphate wherein the ruthenium present has a valency of +4 can be represented as follows:

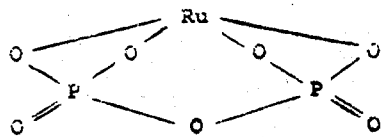

and wherein the ruthenium present has a valency of +3 as follows:

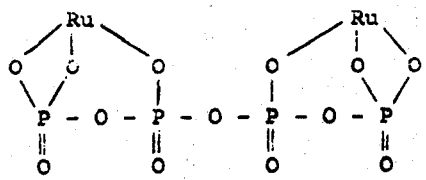

A cyclic phosphate in accordance with our invention wherein the ruthenium present has a valency of +3 can be represented as follows:

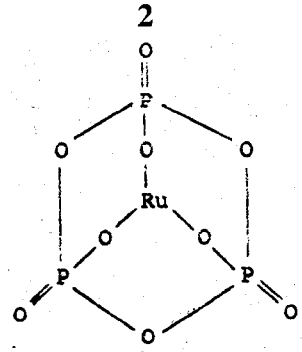

and wherein the ruthenium present has a valency of +4 as follows:

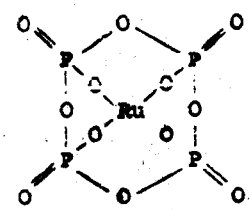

Also encompassed within the definition of the new ruthenium phosphates described and claimed herein are those wherein one or more metals, having a valency of +1 to +8, inclusive, is found in place of some of the ruthenium atoms in the new compounds. In general, these metals can replace up to about 90 percent of the ruthenium component, but generally only up to about 70 percent of the ruthenium component. Although any metal in the periodic table can be present in the new phosphate, those that are more likely to be present are lanthanum, titanium, zirconium, tin, lead, bismuth, niobium, vanadium, calcium, strontium, barium, iron, cobalt, nickel, rhodium, platinum, palladium and iridium. Thus, a compound falling within the definition herein containing, for example, trivalent ruthenium and a trivalent metal, M, such as iron, can be represented as follows:

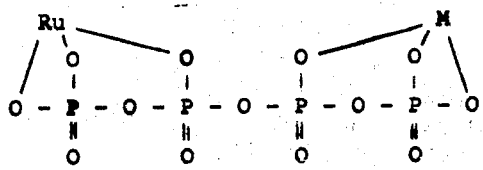

The new ruthenium phosphates defined and claimed herein can be prepared using any ruthenium salt or oxide or even elemental ruthenium and any phosphorus oxide, acid or salt wherein phosphorus has a vanence of +3 or +5. Specific examples of ruthenium salts or oxides that can be used include $RuCl_3$, $RuO_2$, etc. and specific examples of phosphorus oxides, salts or acids include $P_2O_5$, $HPO_3$, $H_3PO_4$, $H_4P_2O_7$, $PCl_3$, $P_2O_3$, $(NH_4)_2HPO_4$, $(NH_4)_3PO_4$, $NH_4H_2PO_4$, etc. The preparation of the new compound is easily effected, for example, by heating ruthenium metal, or a salt or oxide thereof, with approximately an equal molar amount of the defined phosphorus compound in air from ambient temperature and pressure over a period of about one to about 120 hours to a temperature of about 500° to about 1200° C., or higher. If desired, additional heat treatment at such temperature can be maintained for about one to about 6 hours to assure substantially complete reaction. If a trivalent phosphorus compound is used, it will be converted to pentavalent phosphorus during the reaction. In some cases another metal, such as defined above, in elemental form or as an oxide or as a salt thereof, can be present, either as an impurity or deliberately. When such mixture is heated, as defined, the resultant ruthenium phosphate will also have as a component thereof the additional metal in a ratio corresponding to its presence in the reaction mixture. Recovery of the ruthenium phosphate from the reaction mixture at the end of the reaction period is simple, for at the end of the reaction the novel ruthenium phosphate is the product remaining. The excess phosphorus compound will have evaporated during the process.

The preparation of the new ruthenium phosphates can be illustrated by the following:

EXAMPLE 1

0.01 mol of $RuCl_3$ was mixed in a ceramic crucible with 2.0 cc of water and 0.1 mol of $H_3PO_4$ and then heated in air from 150° steadily to 1200° C. over a period of 48 hours. The resulting material, which was a solid black mass, was subjected to X-ray diffraction. The resulting pattern showed a crystalline compound which could not be identified with any known X-ray patterns of ruthenium compounds. A portion of the material was subjected to elemental analysis and was found to possess the following atomic ratios: Ru:1.0, P:4.2 and O:11.5. The compound formed, therefore, had the following formula: $RuP_4O_{12}$, a cyclic ruthenium phosphate.

EXAMPLE 2

Example 1 was repeated except that 0.04 mol of $H_3PO_4$ was used and the final temperature reached during the heating was 800°C. A stable ruthenium compound having the following atomic ratio was obtained: Ru:1, P:2.2, O:7.3. The compound formed, therefore, had the following formula: $RuP_2O_7$, a linear ruthenium phosphate.

EXAMPLE 3

Example 1 was repeated except that 0.04 mol of $P_2O_5$ was used in place of $H_3PO_4$ and the final temperature reached during heating was 800° C. A stable ruthenium compound having the following atomic ratio was obtained: Ru:1, P:2.8 and O:10. The compound formed, therefore, had the following formula: $Ru_2P_6O_{19}$, a linear ruthenium phosphate.

EXAMPLE 4

Example 1 was repeated except that 0.1 mol of $P_2O_5$ was used. A stable ruthenium compound having the following atomic ratio was obtained: Ru:1, P:3.9 and O:12.1. The compound formed, therefore, had the following formula: $RuP_4O_{12}$, a cyclic ruthenium phosphate.

EXAMPLE 5

Example 4 was repeated except that 0.05 mol of $NH_4H_2PO_4$ was used in place of $P_2O_5$ and the final temperature reached was 800° C. A stable ruthenium compound having the following atomic ratio was obtained: Ru:1.1, P:3.2 and O:9.0. The compound formed, therefore, had the following formula: $RuP_3O_9$, a cyclic ruthenium phosphate.

In each of the above examples, a portion of the compound obtained was reheated to the highest temperature reached during the reaction for 6 hours and then again subjected to elemental analysis. In each case the X-ray pattern remained stable and the elemental analysis did not change. In no case did the X-ray pattern indicate the presence of ruthenium oxide.

EXAMPLE 6

The black mass obtained in Example 1 was ground into a fine powder and mixed with ethyl alcohol to form a thin paste which was painted as a thin coating on a ceramic surface. Another ceramic surface was coated with a paste made up of ruthenium oxide and ethyl alcohol. Each coated piece was placed in a furnace and heated for 20 hours at 1200° C., after which they were cooled and examined. The first piece retained its coating, while that carrying ruthenium oxide was completely devoid of coating.

EXAMPLE 7

A ceramic monolith was coated several times with a paste containing the ruthenium phosphate of Example 1 prepared as described above in Example 6 until 103.0 milligrams of ruthenium phosphate was deposited thereon, corresponding to 25 milligrams of ruthenium element. The coated monolith was placed in an open quartz container and attached therein to a Cahn microbalance. The entire unit was placed in a quartz tube and then heated in a slow flow of nitrogen at a temperature of 600° C. for 4 hours to assure a complete removal therefrom of water and ethyl alcohol and to obtain a product having a constant weight. The coated product was then subjected to a slow flow of air at a temperature of 1000° C. for 36 hours and the weight change thereof was measured at periodic intervals. The same test was repeated except that $RuO_2$ was substituted for the ruthenium phosphate of Example 1. The results obtained are set forth below in Table I.

Table I

| Material Tested | Weight Percent Change In Time, Hours | | |
| --- | --- | --- | --- |
|  | 0–1 | 1–5 | 5–36 |
| Ruthenium Phosphate Of Example 1 | −5.6 | 0 | 0 |
| $RuO_2$ | −3.6 | −10.7 | −77 |

The stability of the new compounds herein is apparent from an observation of the data in Table I. While the ruthenium phosphate of Example 1 has lost but 5.6 weight per cent due to volatility when subjected to an oxygen-containing gas at the end of 36 hours, the 91.3 weight per cent of the ruthenium oxide was lost in the second sample.

Not only are the new ruthenium phosphates defined and claimed herein stable in the presence of oxygen, but they are extremely effective in reducing nitrogen oxides to nitrogen without the formation of significant amounts of ammonia. Accordingly, they can be used to selectively reduce the nitrogen oxide content of an exhaust gas from an internal combustion engine. This is shown in Example 8.

EXAMPLE 8

Gamma alumina beads having a diameter of one-sixteenth inch and a surface area of 195 square meters per gram were mixed with the powdered ruthenium phosphate prepared in Example 1 or Example 3 for 1 hour until a coherent coating was formed thereon. 5 cc of the catalysts so prepared were placed in separate tubes maintained at atmospheric pressure and 240° C. and a gas containing one-half weight percent NO, 2.0 weight percent $H_2$ and 97½ weight percent argon was passed thereover at a 24,000 gas hourly space velocity for one-half hour. In each case 61 weight percent of the NO was converted. No analysis was made to determine the amount of ammonia formed. The tests were repeated at a temperature of 300° C. In each case 100 percent of the NO was converted. Except for 5½ weight percent conversion to ammonia, the remainder of the NO was converted to nitrogen.

Auto exhaust gases of the following composition can be treated with the new ruthenium phosphate compounds herein to selectively form nitrogen as substantially the only nitrogen-containing product:

| | Components | Broad Range, Mol % | Usual Range, Mol % |
|---|---|---|---|
| (1) | $NO_x$ where x is 1 or 2 | 50–5000 ppm[2] | 100–3500 ppm[2] |
| (2) | Free molecular oxygen | 0–5 | 0.5–2 |
| (3) | Free molecular hydrogen | 0.1–4 | 0.2–1 |
| (4) | CO | 0.2–8 | 0.4–2 |
| (5) | Hydrocarbons[1] | 0–4000 ppm[2] | 50–1000 ppm[2] |
| (6) | $H_2O$ | 5–16 | 10–13 |
| (7) | $CO_2$ | 5–16 | 10–13 |
| (8) | Lead (as metal) | 0–12 ppm[2] | 0–4 ppm[2] |
| (9) | Nitrogen | 53–89 | 68–78 |

1 — Calculated as carbon
2 — By volume

The exhaust gases are merely brought into contact with the new ruthenium phosphates at a temperature of about 320° to about 900° C., preferably about 400° to about 650° C. and a pressure of about 0 to about 140 pounds per square inch gauge (about 0 to about 10 kilograms per square centimeter), preferably about 0 to about 14 pounds per square inch gauge (about 0 to about 1.0 kilograms per square centimeter) using a gas hourly space velocity of about 20,000 to about 300,000, preferably about 30,000 to about 200,000, volumes of gas per volume of catalyst.

Obviously, many modifications and variations of the invention, as hereinabove set forth, can be made without departing from the spirit and scope thereof, and, therefore, only such limitations should be imposed as are indicated in the appended claims.

We claim:

1. As a new compound a ruthenium phosphate selected from the following formulae:

(I) $Ru_m(P_nO_{3n+1})$, wherein $n$ is an integer of at least 2, $$m = \left[\frac{n}{8}\right] + 1 \text{ to } \frac{n+2}{2}$$

when $n$ is an even integer and $$m = \left[\frac{n-3}{8}\right] + 2 \text{ to } \frac{n+1}{2}$$

when $n$ is an odd integer; and (II) $Ru_{m_1}(P_{n_1}O_{3n_1})$, wherein $n_1$ is an integer of at least 3, $$m_1 = \left[\frac{n_1-2}{8}\right] + 1 \text{ to } \frac{n_1}{2}$$

when $n_1$ is an even integer and $$m_1 = \left[\frac{n_1-5}{8}\right] + 2 \text{ to } \frac{n_1-1}{2}$$

when $n_1$ is an odd integer.

2. The compound of claim 1 wherein $n$ is an integer ranging from 2 to 20 and $n_1$ is an integer ranging from 3 to 10.

3. The new compound of claim 1 wherein $n$ is an integer ranging from 2 to 10 and $n_1$ is an integer ranging from 3 to 7.

4. As a new compound a ruthenium phosphate having the following formula:

$$Ru_m(P_nO_{3n+1}),$$

wherein $n$ is an integer of at least 2, $$m = \left[\frac{n}{8}\right] + 1 \text{ to } \frac{n+2}{2}$$

when $n$ is an even integer and $$m = \left[\frac{n-3}{8}\right] + 2 \text{ to } \frac{n+1}{2}$$

when $n$ is an odd integer.

5. The compound of claim 4 wherein $n$ is an integer ranging from 2 to 20.

6. The compound of claim 4 wherein $n$ is an integer ranging from 2 to 10.

7. As a new compound a ruthenium phosphate having the following formula:

$$Ru_{m_1}(P_{n_1}O_{3n_1}),$$

wherein $n_1$ is an integer of at least 3, $$m_1 = \left[\frac{n_1-2}{8}\right] + 1 \text{ to } \frac{n_1}{2}$$

when $n_1$ is an even integer and $$m_1 = \left[\frac{n_1-5}{8}\right] + 2 \text{ to } \frac{n_1-1}{2}$$

when $n_1$ is an odd integer.

8. The compound of claim 7 wherein $n_1$ is an integer ranging from 3 to 10.

9. The compound of claim 5 wherein $n_1$ is an integer ranging from 3 to 7.

10. $RuP_2O_7$.
11. $RuP_3O_9$.
12. $RuP_4O_{12}$.
13. $Ru_2P_6O_{19}$.

* * * * *